United States Patent
Chapelet et al.

(10) Patent No.: US 10,525,509 B2
(45) Date of Patent: Jan. 7, 2020

(54) INSTALLATION FOR SORTING ARTICLES WITH A SORTING CONVEYOR HAVING PIVOTALLY MOUNTED FLAPS

(71) Applicant: Solystic, Bagneux (FR)

(72) Inventors: Jacques Chapelet, Portes les Valence (FR); Raymond Chifflet, Guilherand Grange (FR); Damien Pano, Valence (FR)

(73) Assignee: Solystic (FR)

( * ) Notice: Subject to any disclaimer, the term of this patent is extended or adjusted under 35 U.S.C. 154(b) by 0 days.

(21) Appl. No.: 15/920,816

(22) Filed: Mar. 14, 2018

(65) Prior Publication Data
US 2018/0264521 A1    Sep. 20, 2018

(30) Foreign Application Priority Data
Mar. 17, 2017   (FR) ...................................... 17 52184

(51) Int. Cl.
*B65G 47/64*     (2006.01)
*B07C 5/36*      (2006.01)
(Continued)

(52) U.S. Cl.
CPC ............... *B07C 5/362* (2013.01); *B07C 5/04* (2013.01); *B65G 47/46* (2013.01); *B65G 47/644* (2013.01);
(Continued)

(58) Field of Classification Search
CPC .... B07C 1/10; B07C 1/16; B07C 5/04; B07C 5/36; B07C 5/362; B65H 29/16;
(Continued)

(56) References Cited

U.S. PATENT DOCUMENTS 2,937,739 A * 5/1960 Levy ..................... B07C 3/08
                                                198/349
4,756,399 A * 7/1988 Scata ................... B65G 47/647
                                                198/369.2

(Continued)

FOREIGN PATENT DOCUMENTS

| DE | 199 63 021 A1 | 6/2001 |
| FR | 2 481 959 A1 | 11/1981 |
| WO | 93/01007 A1 | 1/1993 |

OTHER PUBLICATIONS

English Translation of FR 2481959 A1; Inventor: Divoux; Published Nov. 1981 (Year: 1981).*

(Continued)

*Primary Examiner* — Joseph C Rodriguez
(74) *Attorney, Agent, or Firm* — Ware, Fressola, Maguire & Barber LLP

(57) ABSTRACT

A sorting conveyor has pivotally mounted flaps for sorting articles into sorting outlets as a function of a sorting indication affixed to each of the articles. The conveyor includes a monitoring and control unit designed to cause each flap to pivot between a closed position in which the flap forms a conveyor portion suitable for conveying an article in a certain conveying direction and an open position in which the flap interrupts conveying of an article on the conveyor to deflect it towards an appropriate sorting outlet. The monitoring and control unit is also arranged to retrieve thickness data from a memory giving a certain thickness for the article to be deflected, and to respond by causing the flap to pivot into an open position through a certain opening amplitude determined as a function of the thickness data about the article that is to be deflected.

14 Claims, 2 Drawing Sheets

(51) Int. Cl.
*B65G 47/46* (2006.01)
*B65H 29/16* (2006.01)
*B07C 5/04* (2006.01)
*B65H 29/58* (2006.01)
*B07C 5/10* (2006.01)

(52) U.S. Cl.
CPC .............. *B65H 29/16* (2013.01); *B65H 29/58* (2013.01); *B07C 5/10* (2013.01); *B65G 2201/0285* (2013.01); *B65H 2404/2691* (2013.01)

(58) Field of Classification Search
CPC ........................ B65H 29/58; B65H 2220/02; B65H 2220/11; B65H 2404/242; B65H 2511/13; B65H 2511/214; B65G 47/64; B65G 47/647; B65G 47/644; B65G 47/645
See application file for complete search history.

(56) References Cited

U.S. PATENT DOCUMENTS

| | | | |
|---|---|---|---|
| 4,852,715 A | 8/1989 | Kmetz | |
| 5,190,162 A * | 3/1993 | Hartlepp | B07C 3/082 |
| | | | 209/360 |
| 9,096,405 B2 * | 8/2015 | Nakano | B65G 47/647 |
| 9,592,989 B2 * | 3/2017 | Herrmann | B65H 39/115 |
| 9,604,258 B2 * | 3/2017 | Layne | B07C 5/36 |
| 9,745,133 B2 * | 8/2017 | Miller | B65G 15/58 |
| 2017/0197233 A1* | 7/2017 | Bombaugh | B07C 5/36 |

OTHER PUBLICATIONS

English Translation of WO 93/01007; Inventor: Bernard; Published: Jan. 1993 (Year: 1993).*

* cited by examiner

INSTALLATION FOR SORTING ARTICLES WITH A SORTING CONVEYOR HAVING PIVOTALLY MOUNTED FLAPS

CROSS REFERENCE TO RELATED APPLICATION

This application claims priority under 35 USC § 119 to French Patent Application No. 1752184 filed on Mar. 17, 2017, which application is hereby incorporated by reference in its entirety.

TECHNICAL FIELD

The invention relates to an installation for sorting articles of the postal parcel type.

The invention relates more particularly to a sorting conveyor having pivotally mounted flaps for discharging the articles towards appropriate sorting outlets.

PRIOR ART

A sorting installation for sorting postal parcels generally has a feed inlet via which the parcels are fed in, and a sorting conveyor that transports the parcels coming from the feed inlet in series and flat.

The sorting conveyor is generally arranged so that its conveying path goes along the sorting outlets into which the parcels are to be sorted.

This type of conveyor is usually equipped with pivotally mounted flaps, of the types described in Documents WO 93/01007, DE 199 63 021, FR 2 481 959, and U.S. Pat. No. 4,852,715, designed to discharge the parcels into the sorting outlets disposed beneath them.

A monitoring and control unit then causes the flaps to open as a function of a sorting indication affixed to each parcel, retrieved from a memory, and corresponding to the sorting outlet into which the respective parcel is to be sorted.

The opening amplitude through which the flaps open is maintained constant by using an actuator of the crank rod type.

Thus, in order to prevent parcels of non-uniform shapes and thicknesses from jamming at the sorting outlets, the opening amplitude of the flaps is set to its maximum extent.

However, repeated opening to maximum amplitude generates considerable amounts of vibration on the flaps, giving rise both to premature wear on the crank rods and also to noise.

Opening the flaps to maximum amplitude also requires a large amount of drive torque for actuating the crank rods, thereby necessarily increasing electricity consumption and opening time.

SUMMARY OF THE INVENTION

An object of the invention is therefore to remedy those drawbacks.

To this end, the invention therefore provides a sorting conveyor having pivotally mounted flaps for sorting articles of the postal parcel type into sorting outlets as a function of a sorting indication affixed to each of said articles, said conveyor including a monitoring and control unit designed to cause each flap to pivot between a closed position in which the flap forms a conveyor portion suitable for conveying an article in a certain conveying direction and an open position in which the flap interrupts conveying of an article on said conveyor to deflect it towards an appropriate sorting outlet, said monitoring and control unit being arranged to retrieve thickness data from a memory giving a certain thickness for said article to be deflected, and to respond by causing the flap to pivot into an open position through a certain opening amplitude determined as a function of said thickness data about the article that is to be deflected, said sorting conveyor being characterized in that the sorting conveyor includes at least one cog belt fastened to each flap so as to cause the flap to pivot about a pivot axis, said cog belt being driven in rotation by a motor controlled by the monitoring and control unit.

The basic idea of the invention consists in causing the opening amplitude of the flaps to vary as a function of the thickness data for the articles to be discharged, and more particularly in reducing the opening amplitude for the articles that are of small thickness, e.g. for parcels of thickness in the range a few millimeters to about a hundred millimeters.

Not only is the vibration reduced but also the saving in time obtained when opening the flaps to a reduced extent makes the conveying more uniform (the mailpiece is not disturbed by an opening that is too large).

In advantageous manner, a small opening amplitude reduces the risks of an upstream article that is still being conveyed on the flap while said flap is pivoting being flung off the conveyor by a "catapult effect". This varying of the opening amplitude is particularly useful for articles of small size that are lighter in weight and therefore more sensitive to the catapult effect.

The sorting machine of the invention may also have the following features:
- at least one flap is mounted to pivot such that its upstream end pivots upwards, relative to said conveying direction;
- at least one flap is mounted to pivot such that its downstream end pivots downwards, relative to said conveying direction;
- a flap mounted to pivot such that its downstream end pivots downwards is disposed upstream from and adjacent to a flap mounted to pivot such that its upstream end pivots upwards, relative to said conveying direction, and said monitoring and control unit is designed to cause both flaps to pivot simultaneously between the open and closed positions;
- each flap has a conveyor belt coated with a material procuring grip for the articles;
- the opening amplitude of a flap in the open position lies in the range 5° to 30°.

The invention also provides a sorting installation including a feed inlet via which articles are fed in, sorting outlets into which the articles are sorted, and a sorting conveyor having pivotally mounted flaps for conveying the articles in series and flat from the feed inlet to the appropriate sorting outlets, in which conveyor the opening amplitude through which the flaps are opened is modified as a function of the thicknesses of the articles to be discharged. The installation also includes a sensor disposed upstream from the flaps and for measuring the thicknesses of the articles.

Such a sorting installation makes it possible to handle a large number of non-uniform articles rapidly, while also remedying the above-mentioned problems. The sorting installation is particularly advantageous for sorting postal parcels or articles in a logistics center, of the online sales platform type.

BRIEF DESCRIPTION OF THE DRAWINGS

The present invention can be better understood and other advantages appear on reading the following description and on examining the accompanying drawings, in which.

DESCRIPTION OF AN EMBODIMENT

Figure 1:
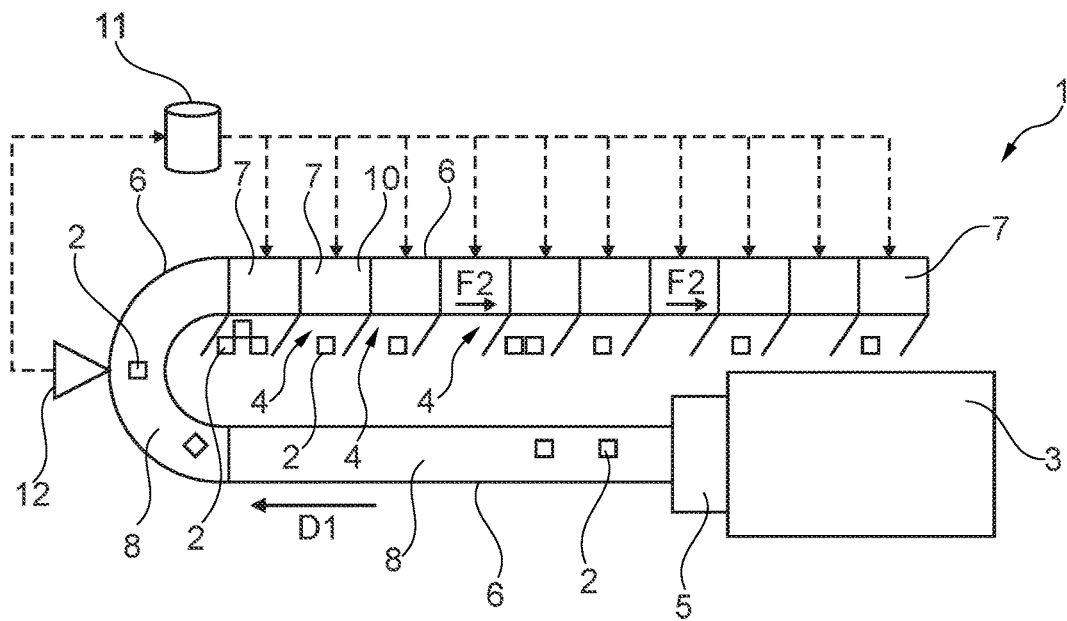
FIG. 1 is a highly diagrammatic view of the sorting installation of the invention.

FIG. 1 shows a sorting installation 1 of the invention that is designed for sorting articles 2 of the postal parcel type.

The sorting installation 1 includes a feed inlet 3 via which articles 2 are fed in, sorting outlets 4, a read system 5 for reading a delivery address representing a sorting indication for an article 2, and a sorting conveyor 6 having pivotally mounted flaps 7 and on which articles 2 are conveyed in series and flat from the feed inlet 3 to the sorting outlets 4 in a certain conveying direction D1.

Figure 2:
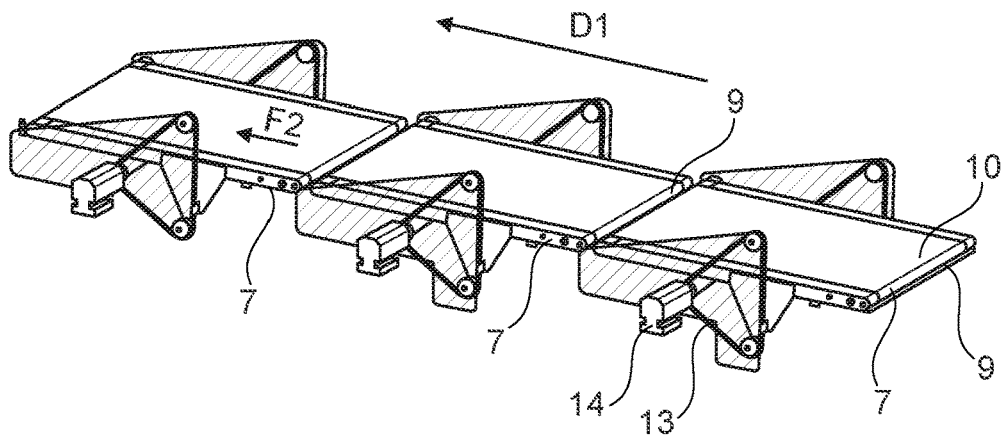
FIG. 2 is a diagrammatic view of a portion of a sorting conveyor of the invention having pivotally mounted flaps, with its pivotally mounted flaps being shown in their closed positions.
Figure 3:
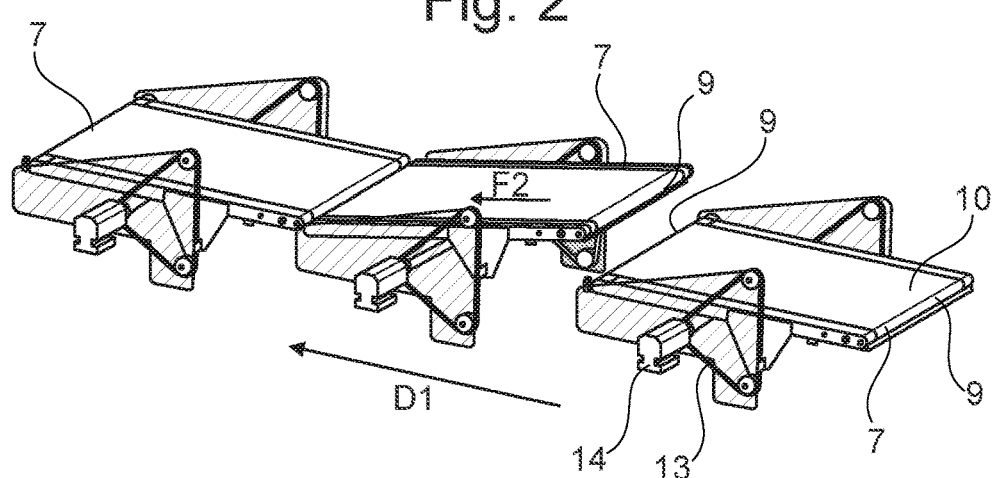
FIG. 3 is a diagrammatic view of a portion of a sorting conveyor of the invention having pivotally mounted flaps, with one of the pivotally mounted flaps being shown in an open position in which it is open to a certain opening amplitude.
Figure 4:
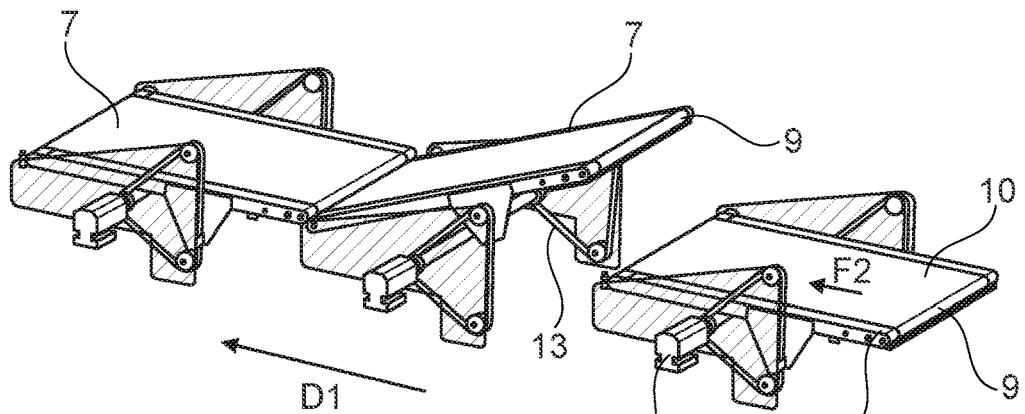
FIG. 4 is a diagrammatic view of a portion of a sorting conveyor of the invention having pivotally mounted flaps, with one of the pivotally mounted flaps being shown in an open position in which it is open to another opening amplitude.

A portion of the sorting conveyor 6 of the invention is shown in FIGS. 2 to 4, in which portion three pivotally mounted flaps 7 are disposed in mutually adjacent manner. It is understood that the conveyor portion that is shown may be extended at either end by other pivotally mounted flaps 7 or by main conveyor belts 8 that are commonly used for conveying articles 2 and as shown in FIG. 1.

The number of adjacent flaps 7 may vary depending on needs, and as a function of the locations of the sorting outlets 4 along the sorting conveyor 6.

In this example, each flap 7 is mounted to pivot between a closed position (shown in FIG. 2) in which it forms a conveying portion suitable for conveying the articles 2 in the conveying direction D1 and an open position (shown in FIGS. 3, 4, and 6) in which the flap 7 interrupts conveying of an article 2 on the conveyor 6 to deflect it towards an appropriate sorting outlet 4.

In the closed position, the ends 9 of the flaps 7 come flush with other flaps in the closed position to form a conveying path in the conveying direction D1.

Each of the flaps 7 also has a conveyor belt 10 coated with a grip-procuring material enabling it to convey the articles 2 in a conveying direction F2 in the same way as the main conveyor belts 8 when the flap is in its closed position. In addition, when the flaps 7 are in their open positions, the grip-procuring material slows down the sliding of the articles 2.

The conveyor belt 10 of a flap 7 generally operates continuously and independently of operation of the pivoting of the flap.

Each flap 7 is also disposed above a sorting outlet 4 that is allocated to it.

Thus, a flap 7 in the open position makes it possible to deflect an article 2 directly into the sorting outlet 4 into which it is to be sorted.

A ramp or a secondary conveyor system may also be arranged under the flap to guide the deflected article until it reaches the appropriate sorting outlet.

The choice of the sorting outlet 4 into which an article 2 is to be sorted is defined by a monitoring and control unit 11 of the conveyor 6 on the basis of a sorting indication affixed to the article 2 to be discharged. This sorting indication must be determined upstream from the flaps 7 by the read system 5, e.g. an address read system of the Optical Character Recognition (OCR) type when it is for postal sorting.

A flap 7 is thus caused to open by the monitoring and control unit 11 so as to discharge an article 2 into an appropriate sorting outlet 4.

The monitoring and control unit 11 is also designed to cause the flap 7 to pivot into the open position through an opening amplitude that is determined as a function of thickness data for the article 2 to be deflected, which data is already in a memory of the unit.

For this purpose, a thickness sensor 12, e.g. a laser sensor, for sensing the thicknesses of articles 2, and as shown in FIG. 1, is disposed upstream from the flaps 7 on a main conveyor belt section 8 that transports the articles 2 flat and in series between the feed inlet 3 of the sorting installation 1 and the flaps 7. The sensor 12 is designed to produce data about the thicknesses of the articles 2 and to transmit it to the monitoring and control unit 11, which stores it in a memory.

The great majority of the articles 2 require the flaps to open through an opening amplitude lying in the range 5° to 30°.

The monitoring and control unit may also be configured to cause the flap to open through a plurality of predetermined opening amplitudes, such as, for example, 5° 10°, 20° and 30°. This use with predetermined settings simplifies and accelerates the processing performed by the monitoring and control unit.

FIG. 3 shows a flap 7 with an opening amplitude of 10°, and FIG. 4 shows a flap 7 with an opening amplitude of 20°.

Figure 6:
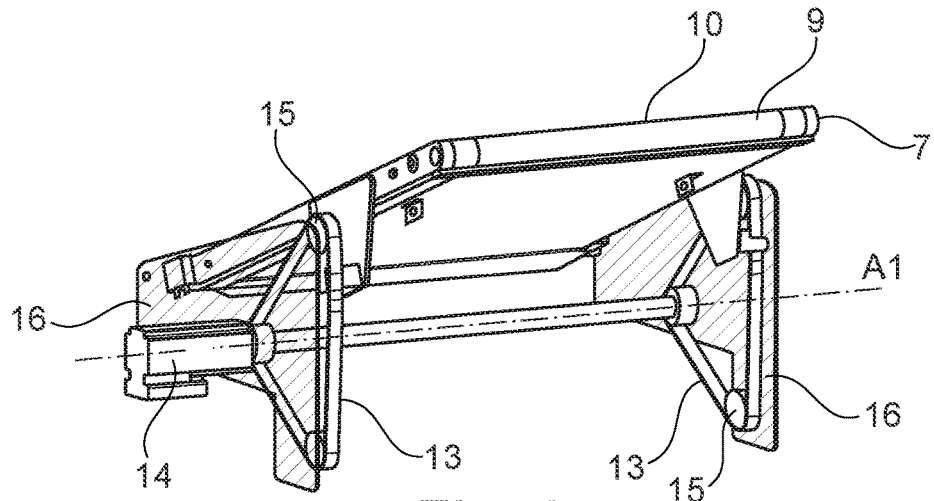
FIG. 6 is a diagrammatic view of an enlargement of a portion of the sorting conveyor, with a pivotally mounted flap being shown in an open position in which it is open to the same opening amplitude as the flap in FIG. 3.

Each flap 7, as shown in FIG. 6, is driven to pivot about an axis A1 by means of a cog belt 13, which is itself driven in rotation by a motor 14. Each cog belt is positioned over rollers 15 rotatably mounted to a side plate 16 (side plates 16 are shown as transparent to assist in illustrating operation of the sorting conveyor). The motor is arranged to operate in either rotation direction depending on the command issued by the monitoring and control unit 11.

The use of a cog belt 13 simplifies managing how the motor 14 is controlled by the monitoring and control unit 11, and reduces the forces delivered by the motor 14 compared with using crank rods.

Motors 14 of the "stepper" or "brushless" type are generally used.

Figure 5:
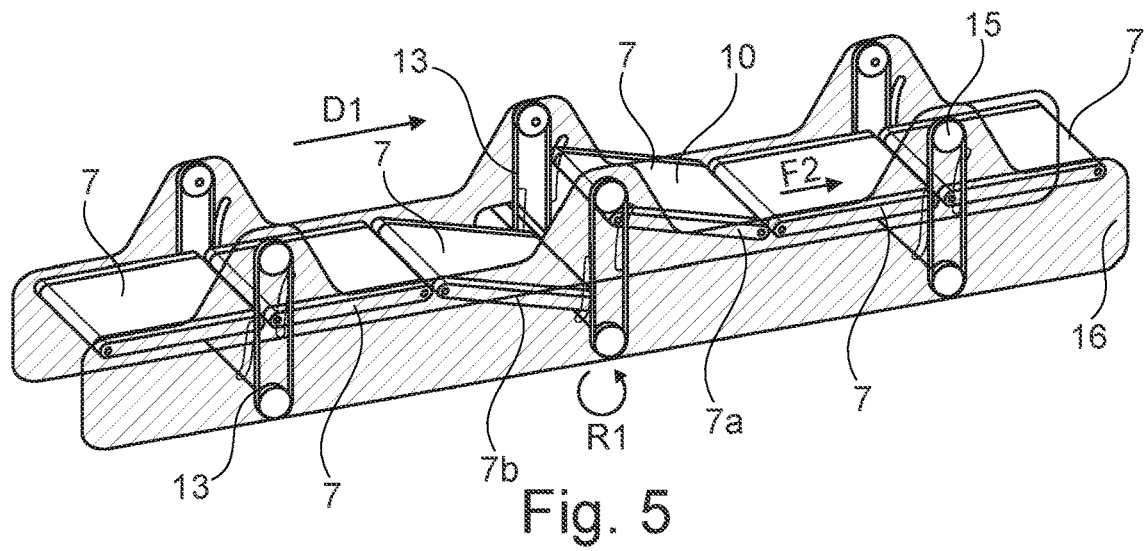
FIG. 5 is a diagrammatic view of a portion of a sorting conveyor of the invention having pivotally mounted flaps, with two of its pivotally mounted flaps being shown in open positions.

FIG. 5 shows a particular arrangement of the invention that includes a plurality of pivotally mounted flaps 7 including an "up" flap 7a that is mounted to pivot such that its downstream end pivots upwards, relative to said conveying direction D1, and that, in this example, is disposed upstream from and adjacent to a "down" flap 7b that is mounted to pivot such that its downstream end pivots downwards, relative to said conveying direction D1.

The flaps 7a and 7b of FIG. 5 are approximately half the size of the flap 7 of FIGS. 2, 3, 4, and 6, thereby halving the stroke over which the weights of the flaps travel.

Thus, the reduced weight of the two flaps 7a, 7b makes it possible to balance the weights over the runs of the cog belts 13 and to procure drive torque savings.

A single cog belt 13 attached to the adjacent ends 9 of the two flaps 7a, 7b suffices to cause them to pivot. Without limiting the scope of the invention, a second cog belt may also be disposed on the other side of the flap on the same shaft A1 driven by the motor 14.

The cog belt moving in rotation in the direction indicated by arrow R1 makes it possible to cause the flaps 7a, 7b to pivot respectively upwards and downwards.

With this configuration of flaps 7, the monitoring and control unit 11 is parameterized to cause the two flaps 7a, 7b to pivot simultaneously between the open and closed positions.

This simultaneous opening configuration for the flaps 7a, 7b advantageously makes it possible to further reduce the opening amplitude of the flaps 7 for articles 2 of small and large thicknesses. The catapult effect on an article 2 present on the up flap 7a while said flap is pivoting upwards is thus further decreased.

A sorting installation 1 of the invention with a sorting conveyor as shown in FIG. 5 operates as follows:

An article 2 stored loose in the feed inlet is put in series and flat on a sorting conveyor 6. The main conveyor belts 8 of the conveyor 6 transport the article in the conveying direction D1 in such a manner that the article goes past the thickness detector 12. Once the article 2 reaches a pivotally mounted flap situated above the sorting outlet into which it is to be sorted, the unit 11 causes the flaps 7b, 7a to open simultaneously, through an opening amplitude between the two flaps that is significantly greater than the thickness of the article that has been detected. The article on the flap 7b is thus driven by the conveyor belt 10 into the appropriate sorting outlet.

What is claimed is:

1. A sorting conveyor for sorting articles of the postal type, comprising:
    pivotally mounted flaps for sorting said articles into sorting outlets as a function of a sorting indication affixed to each of said articles, a monitoring and control unit configured to cause each flap to pivot between a closed position in which the flap forms a conveyor portion suitable for conveying an article in a certain conveying direction and an open position in which the flap interrupts conveying of an article on said conveyor to deflect said article towards an appropriate sorting outlet, said monitoring and control unit configured to retrieve thickness data from a memory giving a certain thickness for said article to be deflected, and to respond by causing the flap to pivot into an open position through a certain opening amplitude determined as a function of said thickness data for the article that is to be deflected, said sorting conveyor including at least one cog belt fastened to each flap so as to cause the flap to pivot about a pivot axis, said cog belt being driven in rotation by a motor controlled by the monitoring and control unit.

2. The sorting conveyor according to claim 1, wherein at least one flap is mounted to pivot such that the upstream end of said flap pivots upwards, relative to said conveying direction.

3. The sorting conveyor according to claim 1, wherein at least one flap is mounted to pivot such that the downstream end of said flap pivots downwards, relative to said conveying direction.

4. The sorting conveyor according to claim 3, wherein a flap mounted to pivot such that the downstream end of said flap pivots downwards is disposed upstream from and adjacent to a flap mounted to pivot such that its upstream end pivots upwards, relative to said conveying direction, and in that said monitoring and control unit is configured to cause both flaps to pivot simultaneously between the open and closed positions.

5. The sorting conveyor according to claim 4, wherein each flap has a conveyor belt coated with a material procuring grip for the articles.

6. The sorting conveyor according to claim 5, wherein the opening amplitude of a flap in the open position lies in the range 5° to 30°.

7. A sorting installation comprising a feed inlet via which articles are fed in, and sorting outlets into which said articles are sorted, said sorting installation including a sorting conveyor having pivotally mounted flaps according to claim 1 for conveying said articles in series and flat from the feed inlet to the appropriate sorting outlets.

8. The sorting installation according to claim 7, wherein the sorting installation includes a sensor disposed upstream from said flaps for measuring the thicknesses of the articles.

9. The sorting conveyor according to claim 4, wherein the opening amplitude of a flap in the open position lies in the range 5° to 30°.

10. The sorting conveyor according to claim 2, wherein a flap mounted to pivot such that the downstream end of said flap pivots downwards is disposed upstream from and adjacent to a flap mounted to pivot such that the upstream end of said flap pivots upwards, relative to said conveying direction, and in that said monitoring and control unit is configured to cause both flaps to pivot simultaneously between the open and closed positions.

11. The sorting conveyor according to claim 10, wherein each flap has a conveyor belt coated with a material procuring grip for the articles.

12. The sorting conveyor according to claim 11, wherein the opening amplitude of a flap in the open position lies in the range 5° to 30°.

13. The sorting conveyor according to claim 10, wherein the opening amplitude of a flap in the open position lies in the range 5° to 30°.

14. The sorting conveyor according to claim 1, wherein each flap has a conveyor belt coated with a material procuring grip for the articles.

* * * * *